United States Patent
Akutsu et al.

(10) Patent No.: US 10,336,529 B2
(45) Date of Patent: Jul. 2, 2019

(54) POLYOLEFIN PACKING CONTAINER

(75) Inventors: Yosuke Akutsu, Kanagawa (JP); Takayuki Ishihara, Kanagawa (JP); Hiroko Hosono, Kanagawa (JP); Keiko Narita, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 1122 days.

(21) Appl. No.: 14/009,625

(22) PCT Filed: Apr. 3, 2012

(86) PCT No.: PCT/JP2012/059033
§ 371 (c)(1),
(2), (4) Date: Oct. 3, 2013

(87) PCT Pub. No.: WO2012/137755
PCT Pub. Date: Oct. 11, 2012

(65) Prior Publication Data
US 2014/0023753 A1    Jan. 23, 2014

(30) Foreign Application Priority Data
Apr. 6, 2011    (JP) .................. 2011-084861

(51) Int. Cl.
*B65D 1/02*        (2006.01)
*B32B 27/32*       (2006.01)
*B65D 85/72*       (2006.01)

(52) U.S. Cl.
CPC .............. *B65D 85/72* (2013.01); *B32B 27/32* (2013.01); *B65D 1/0207* (2013.01); *B65D 1/0215* (2013.01)

(58) Field of Classification Search
CPC .... B65D 1/0207; B65D 85/72; B65D 1/0215; B32B 27/32; A23B 7/148
USPC ........................ 426/106; 206/524.3, 229, 585
See application file for complete search history.

(56) References Cited

U.S. PATENT DOCUMENTS

2003/0105198 A1    6/2003    Plume et al.
2010/0092621 A1    4/2010    Akutsu et al.

FOREIGN PATENT DOCUMENTS

| EP | 2123571 A1 * | 11/2009 | ............ B32B 27/18 |
| JP | 2003-528193 A | 9/2003 | |
| JP | 2008-222291 | 9/2008 | |
| JP | 2009-214914 | 9/2009 | |

(Continued)

OTHER PUBLICATIONS

"Homemade Ketchup". Available online at www.vitamix.com on Jul. 21, 2012.*

(Continued)

*Primary Examiner* — Michele L Jacobson
*Assistant Examiner* — Assaf Zilbering
(74) *Attorney, Agent, or Firm* — Greenblum & Bernstein, P.L.C.

(57) ABSTRACT

The present invention is a polyolefin packing container having on the inner surface thereof an olefin resin layer that contains an ethylenebis fatty acid amide, wherein the ethylenebis fatty acid amide is bleeding in the inner surface in an amount of 12.5 to 200 mg/m$^2$. Without using unstable compound such as organic peroxide, the packing container, even when hot-filled with a content, assures very improved content fall-down performance when inverted.

6 Claims, 4 Drawing Sheets

(56) References Cited

FOREIGN PATENT DOCUMENTS

| | | |
|---|---|---|
| JP | 2011-25964 | 2/2011 |
| JP | 2011-255901 | 12/2011 |
| WO | 2010/029968 | 3/2010 |
| WO | 2010/103985 | 9/2010 |

OTHER PUBLICATIONS

International Search Report in PCT/JP2012/059033 dated Jun. 12, 2012.
Office Action issued in Chinese Counterpart Patent App. No. 201510487655.0, dated Sep. 30, 2016, along with an English translation thereof.
Handbook of Plastic Industry, pp. 160-161, 324-328.

\* cited by examiner

A: BOTTLE HAVING GOOD SLIP-DOWN PROPERTY
B: BOTTLE HAVING POOR SLIP-DOWN PROPERTY

POLYOLEFIN PACKING CONTAINER

TECHNICAL FIELD

This invention relates to a polyolefin packing container of which the inner surface is formed by using an olefin resin and, particularly, to a polyolefin packing container to be filled with highly viscous contents such as ketchup and the like.

BACKGROUND ART

A plastic container is easy to form, can be inexpensively produced and has, therefore, been widely used in a variety of applications. For instance, a container of which the inner wall surface is formed by using an olefin resin such as polyethylene, has been used as a container for containing viscous slurry-like or paste-like contents.

The plastic container containing a viscous content is, in many cases, preserved in an inverted state so that the viscous content filled therein can be quickly discharged or can be used up to the last drip without being left in the container. It is, therefore, desired that when the container is inverted, the content which, for example, may be viscous quickly falls down without staying on the inner wall surface of the container.

As for packing containers for containing viscous non-oily materials as represented by ketchup, in recent years, a variety of proposals have been made in regard to letting nearly the whole amount of the viscous content be quickly discharged out of the container without adhering on the container wall surfaces.

For example, a patent document 1 is proposing a polyethylene container used for containing the ketchup, wherein a polyethylene layer forming the inner surface is blended with an aliphatic amide and, specifically, with an unsaturated aliphatic amide such as oleic acid amide or ethylenebis oleic acid amide as a lubricating agent, or is blended with an organic peroxide together with these aliphatic amides.

The patent document 1 is a patent application filed by the present applicant and teaches that the container disclosed therein enables the non-oily viscous content such as ketchup to fall down excellently when it is inverted. When the contents are hot-filled, addition of the aliphatic amide only is not enough for letting the contents fall down by inverting the container. According to the patent document 1, therefore, the organic peroxide is also added in combination therewith to maintain a high level of content fall-down performance by inverting the container even in case the contents are hot-filled.

Patent documents 2 and 3, too, are the patent applications filed by the present applicant. The patent document 2 describes that upon forming a polymolecular structure of aliphatic amide (amphipatic molecules) and, specifically, saturated aliphatic amide stemming from the lubricating agent in the resin layer on the inner surface of the container, the non-oily viscous content such as ketchup can be excellently fallen down by inverting the container despite the non-oily viscous content was hot-filled.

The patent document 3 proposes the use of a saturated aliphatic amide having not less than 18 carbon atoms and, specifically, the use of a behenic acid amide as a lubricating component in the olefin resin layer on the inner surface of the container, and describes that this produces excellent inverted fall-down performance even in case the non-oily content is hot-filled.

PRIOR ART DOCUMENTS

Patent Documents

Patent document 1: JP-A-2008-222291
Patent document 2: WO2010/029968
Patent document 3: WO2010/103985

OUTLINE OF THE INVENTION

Problems that the Invention is to Solve

As proposed by the above patent documents, it has been known that the viscous non-oily content such as ketchup can be effectively rendered to fall down more easily by inverting the container if amphipatic lubricating component such as aliphatic amide or the like is added. This is based on a principle that the amphipatic compound forms a polymolecular layer by undergoing bleeding on a inner surface of the olefin resin layer in the container, and the polymolecular layer enables the non-oily content to more easily fall down by inverting the container. Specifically, the unsaturated aliphatic amide such as oleic acid amide is effective in further improving the slipping.

However, the non-oily contents such as ketchup and the like are, in many cases, hot-filled for also accomplishing the sterilization and in such a case, the contents cannot be very easily fallen down by inverting the container. This is attributed to that the polymolecular layer formed by bleeding is collapsed by the hot-filling. When the non-oily content is hot-filled, therefore, the saturated aliphatic amide such as stearic acid amide is preferably used as a lubricating agent as proposed by the patent document 3. This is because the saturated aliphatic amide has a higher melting point than the unsaturated aliphatic amide such as oleic acid, and its molecules move less upon being heated suppressing the polymolecular layer from collapsing at the time of hot-filling.

Despite of using the saturated aliphatic amide as a lubricating component as described above, however, the non-oily content does not fall down very easily by inverting the container in case the non-oily content is hot-filled, and further improvements have been desired.

As proposed by the patent document 1, further, it has been known that use of an organic peroxide in combination with the lubricating component is effective in letting the non-oily content that is hot-filled fall down easily by inverting the container. Use of the organic peroxide surely contributes greatly to letting the non-oily content fall down easily. It is considered the organic peroxide works as an anchoring agent for the lubricating component and effectively suppresses the polymolecular layer from collapsing at the time of hot-filling.

However, use of an unstable compound such as organic peroxide is difficult to handle, causes an increase in the cost, and should desirably be not used.

It is, therefore, an object of the present invention to provide a polyolefin packing container which enables the hot-filled non-oily content to fall down very easily by inverting the container even in case the non-oily content is hot-filled without using unstable compound such as organic peroxide.

Means for Solving the Problems

The present inventors have conducted extensive experiments about a variety of compounds that can be used as the
} lubricating component, have learned a novel fact that the ethylenebis fatty acid amide specifically exhibits very peculiar behavior as compared to other aliphatic amides and, when bled in a predetermined amount, enables the content to fall down very easily not only when the content is filled at normal temperature but also when the content is hot-filled, and have thus completed the present invention.

Namely, according to the present invention, there is provided a polyolefin packing container having on the inner surface thereof an olefin resin layer that contains an ethylenebis fatty acid amide, wherein the ethylenebis fatty acid amide is bleeding in the inner surface in an amount of 12.5 to 200 mg/m², and, specifically, 12.5 to 100 mg/m².

In the polyolefin packing container of the invention, the following embodiments are preferably employed.
(1) The ethylenebis fatty acid amide exhibits a plurality of endothermic peaks in a region of 40 to 130° C. on a heating-up profile (differential thermal curve) as measured by the differential scanning calorimetry.
(2) At least an ethylenebis oleic acid amide is contained as the ethylenebis fatty acid amide.
(3) The ethylenebis fatty acid amide is partly the ethylenebis oleic acid amide, and the rest is a compound represented by the following formula (1),

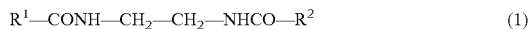

$$R^1\text{—CONH—CH}_2\text{—CH}_2\text{—NHCO—}R^2 \quad (1)$$

wherein
  $R^1$ and $R^2$ may be the same or different, and are unsaturated or saturated aliphatic hydrocarbon groups having 14 to 22 carbon atoms.
(4) The ethylenebis fatty acid amide is partly the ethylenebis oleic acid amide, and the rest of the ethylenebis fatty acid amide contains a half-saturated bisamide of which either $R^1$ or $R^2$ in the above formula (1) is a saturated aliphatic hydrocarbon group.
(5) At least not less than 3% of the ethylenebis fatty acid amide is the half-saturated bisamide on condition that not less than 55% of the ethylenebis fatty acid amide is the ethylenebis oleic acid amide as measured by the liquid chromatography.
(6) The polyolefin packing container contains a content, the content being filled at a temperature of 40 to 90° C., and if the temperature at which the content is filled is represented by Tp, peak temperatures of the endothermic peaks are represented by Ti (i=1, 2, 3, - - - ), and integrated values of the endothermic peaks are represented by Hi (i=1, 2, 3, - - - ), then the differential thermal curve of the ethylenebis fatty acid amide satisfies the conditions represented by the following formula (2), $$\Delta H_{high}/\Delta H_{total}>0.5 \quad (2)$$

wherein $\Delta H_{total}$ is $\Sigma \Delta Hi$, and
  $\Delta H_{high}$ is the sum of integrated values of the endothermic peaks present in a temperature region satisfying Ti>Tp+10.
(7) The content is filled at a temperature of 60 to 90° C.
(8) The content is a non-oily content.
(9) The non-oily content is a ketchup.

According to the present invention, there is further provided a hot-packed body comprising a content hermetically hot-filled in the polyolefin container.

Effects of the Invention

The polyolefin packing container of the present invention has a distinguished feature that an ethylenebis fatty acid amide is added as a lubricating component to the polyolefin resin layer on the inner surface thereof (the content thereof is 0.2 to 1 wt % in the case of the polyethylene resin, and is 1.2 to 5 wt % in the case of the polypropylene resin), and that the ethylenebis fatty acid amide is bleeding therein in an amount in a region of 12.5 to 200 mg/m² and, preferably, 12.5 to 100 mg/m² enabling not only the content that is filled at normal temperature but also the content that is hot-filled to excellently fall down by inverting the container. That is, when the container filled with the non-oily content such as ketchup is held in an inverted state, the non-oily content quickly falls down without adhering on the inner surface of the container and is clogged in the container mouth portion which is on the lower side ready to be easily taken out from the mouth of the container.

In the invention, the reason why the content falls down more easily by inverting the container is based on the following principle.

Namely, the ethylenebis fatty acid amide comprises amphipatic molecules with the amide group as a hydrophilic group and the aliphatic group as a hydrophobic group. With the ethylenebis fatty acid amide being added to the polyolefin resin layer on the inner surface, the lubricating component bleeds out with the passage of time after the container has been formed, and a polymolecular layer of amphipatic molecules is formed as shown in FIG. 1. The polymolecular layer is forming dense and hydrophobic hydrocarbon chains in the surface thereof and assumes the state of a low interaction with the content. When the container is held inverted, therefore, the content slips down on the surface of the polymolecular layer of the aliphatic amide on the inner surface of the container; i.e., the content falls down without adhering on the inner surface of the container.

The above fundamental principle has been described in the patent documents 1 to 3, too, that were proposed by the present applicant. Here, the ethylenebis fatty acid amide is a very large molecule as will be understood from the molecular structure that has aliphatic hydrocarbon chains bonded to both ends of ethylene via amide bonds. If compared to oleic acid amide or stearic acid amid, therefore, the ethylenebis fatty acid amide bleeds at a very small rate, and a considerable period of time is required after it is formed until the amount of bleeding thereof becomes comparable to that of the oleic acid amide or the stearic acid amide. So far, the ethylenebis fatty acid amide was evaluated under the same conditions as those for the oleic acid amide or the stearic acid amide. Therefore, the inverted fall-down performance had been very underestimated. For instance, Table 1 of the patent document 1 shows the speed of fall down of when the olefin resin layer is blended with the ethylenebis oleic acid amide in an amount of 1000 ppm. Namely, according to the measured value, the fall-down speed is lower than that of when the oleic acid amide is used, and the inverted fall-down performance is not satisfactory.

Referring to Examples 1 and 2 appearing later, on the other hand, if the polyethylene is used in an amount of 0.5 wt % and if the fall-down speed is measured in a state where the amount of bleeding in the surface is in a range of 12.5 to 200 mg/m² after the passage of a predetermined period time from when the container was formed, the fall-down speed very increases and it is learned that the inverted fall-down performance is strikingly improved.

According to the present invention as described above, the ethylenebis fatty acid amide is used as a lubricating component, the amount of use thereof is set to be relatively large (content being 0.2 to 1 wt % in the case of the polyethylene resin, and being 1.2 to 5 wt % in the case of the polypropylene resin), and a predetermined bleeding amount (12.5 to 200 mg/m$^2$) is maintained after the passage of a predetermined period of time from the forming, making it possible to produce excellent inverted fall-down performance without the need of using unstable compound such as organic peroxide.

In the present invention, "after the passage of a predetermined period of time from the forming" stands for that the content (non-oily content) is filled after the passage of a predetermined period of time from the forming. That is, after the content is filled, the lubricating component is limited from bleeding due to the internal pressure produced by the content. Basically, therefore, the amount of bleeding does not increase after the content is filled.

According to the present invention, further, the content that is hot-filled, too, falls down excellently when the container is inverted owing to the use of the ethylenebis fatty acid amide as the lubricating component. Namely, as will be understood from the schematic diagram of a polymolecular layer of FIG. 1, the ethylenebis fatty acid amide has a structure in which two hydrophobic groups are extending from the two hydrophilic groups via ethylene chains. The two hydrophilic groups in a molecule forms a planar network with the neighboring molecules via hydrogen bonds and, at the same time, has a high melting point since each molecule is long. This presumably contributes to forming a stable polymolecular layer structure that is not easily collapsed even by the hot-filling.

MODE FOR CARRYING OUT THE INVENTION

<Structure of the Container>

Figure 1:
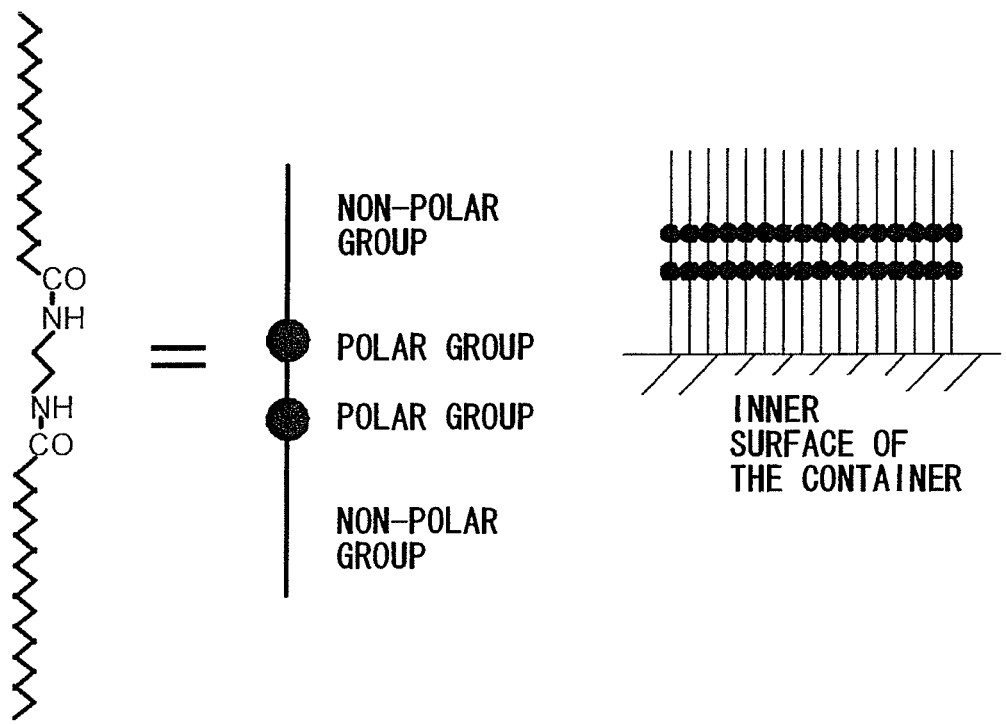
FIG. 1 is a diagram illustrating the form of a polymolecular layer formed by an ethylenebis fatty acid amide that has bled in the inner surface of a container.

Though not limited thereto only, ketchup is a representative example of the content that will be contained in the polyolefin container of the present invention. There can be further exemplified a variety kind of sauces and liquid pastes. Among such contents, non-oily viscous paste-like or slurry-like contents (e.g., having a viscosity at 25° C. of not less than 100 cps) are, particularly, preferred. This is because such viscous contents are desired to be discharged out of the container without staying on the container walls. Among these viscous contents, further, the present invention is preferably applied to such foods as ketchups, sauces, mustards and, specifically, non-oily contents. These foods are hot-filled (usually at 80 to 90° C.) for also the purpose of sterilization and, as described above, the polyolefin container of the invention is capable of maintaining excellent inverted content fall-down performance even after subjected to the thermal hysteresis.

In the polyolefin container of the invention described above, the inner layer forming the inner surface of the container comprises a polyolefin resin layer. That is, the polyolefin resin has excellent moisture resistance. Upon forming the inner layer of the container by using the polyolefin resin, therefore, water content contained in the content can be stably maintained so will not to be released for extended periods of time preventing a drop in the quality of the content, effectively avoiding a decrease in the properties of the container caused by swelling due to water and, besides, offering advantage from the standpoint of cost.

As the polyolefin resin, though there is no particular limitation, there can be exemplified low-density polyethylene, straight chain low-density polyethylene, intermediate- or high-density polyethylene, polypropylene, poly 1-butene and poly 4-methyl-1-pentene. There can be used a random or block copolymer of α-olefins, such as ethylene, propylene, 1-butene or 4-methyl-1-pentene, as a matter of course. The above polyolefin resin has a melt flow rate (MFR, JIS K-6728, 190° C.) which, usually, lies in a range of about 0.1 to about 3 g/10 min. The polyolefin resin that is particularly preferably used in the present invention is polyethylene or polypropylene, and low-density polyethylene or straight-chain low-density polyethylene is specifically desired for imparting squeezing property to the container and for squeezing the content out of the container. To take out the content yet imparting rigidity to the container, the polypropylene should be used.

The polyolefin container of the invention has an inner layer formed by using the polyolefin resin, the inner layer being blended with a predetermined lubricating component. A variety of resin layers known per se. may be formed on the outer side of the inner layer to form a multi-layer structure. When the multi-layer structure is formed, the lubricating component added to the polyolefin resin layer does not bleed on the outer surface of the container but selectively bleeds on the inner surface of the container forming, on the inner surface of the container, a polymolecular layer which fully works to produce inverted fall-down performance to a sufficient degree, which is very favorable for enhancing the inverted fall-down performance.

A representative example of the multi-layer structure will be a 5-layer structure comprising inner surface layer (polyolefin resin layer)/adhesive layer/oxygen-barrier layer/adhesive layer/outer surface layer. In the above layer structure, the adhesive layer is formed by using an adhesive resin such as an acid-modified olefin resin, and the oxygen-barrier layer is formed by using an oxygen-barrier resin such as an ethylene/vinyl alcohol copolymer. Further, the outer surface layer is, generally, formed by using the same polyolefin resin as the inner surface layer, but may also be formed by using the other thermoplastic resin layer such as a polyester resin, e.g., polyethylene terephthalate.

In the present invention, the lubricating component may be added to the inner surface layer only and does not have to be added to other layers. What contributes to improving the inverted fall-down performance is the lubricating component only that is added to the inner surface layer. The component added to other layers does not contribute to improving the inverted fall-down performance but simply results in an increase in the cost.

Further, the multi-layer structure is not limited to the above 5-layer structure only, but may be a structure having a further increased number of outer surface layers by using, for example, an oxygen-barrier layer and an adhesive layer. Moreover, the inner surface layer blended with the ethylenebis fatty acid amide may be formed by using a low-density polyethylene or a straight chain low-density polyethylene and by using a high-density polyethylene layer, which is suited for printing, on the outer surface side to realize a 2-layer structure.

In the present invention, the layers constituting the container wall may have thicknesses adapted to their functions. For example, the inner surface layer blended with the lubricating component should have a thickness of at least not less than 30 μm. If the thickness is too small, the lubricating component (ethylenebis fatty acid amide) does not bleed in amounts sufficient for forming the polymolecular layer and, as a result, the inverted fall-down performance becomes unsatisfactory. Further, the adhesive layer may have a thickness enough for maintaining a sufficiently large adhesive force, and the oxygen-barrier layer should have a thickness enough for exhibiting favorable oxygen-barrier property while effectively preventing the content from being deteriorated by oxygen that permeates through.

The polyolefin container of the invention having the above structure can be produced by using resins (or resin compositions) for constituting the layers, extruding, for example, a molten parison by extrusion forming, injection forming, co-extrusion forming or co-injection forming, followed by the known direct-blow forming, or by forming a test tube-like preform for forming a container, subjecting the preform to the known blow-forming, and can be filled with the content.

Figure 2:
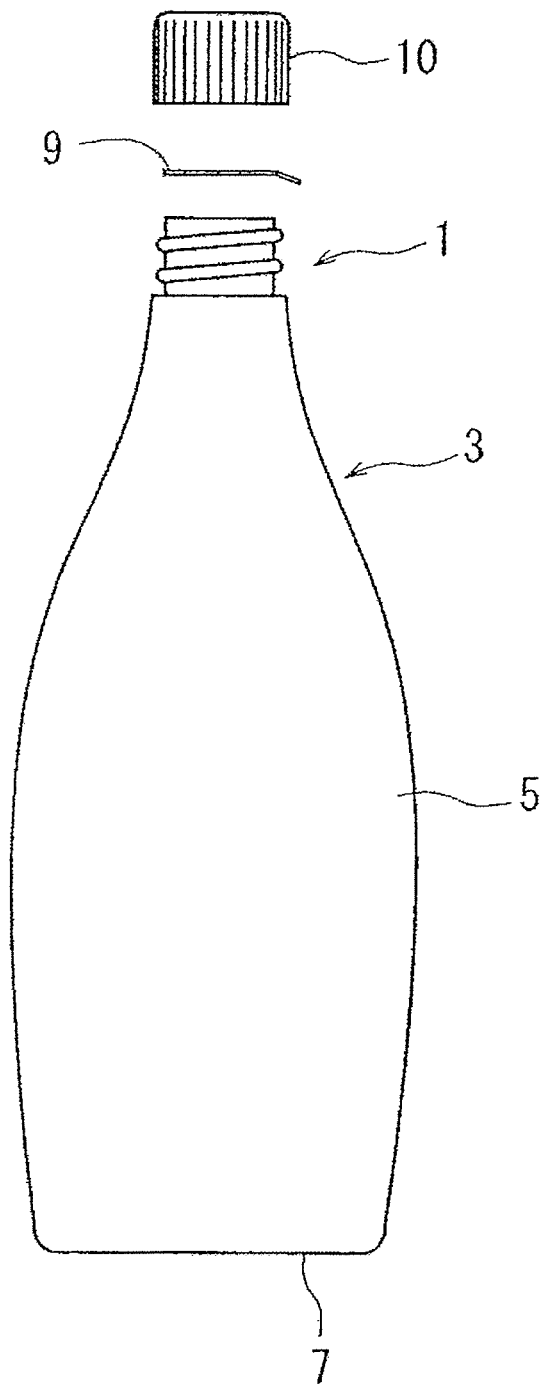
FIG. 2 is a view showing a polyolefin packing container of the present invention together with a cap.

The thus formed polyolefin packing container has the shape of a bottle as shown in, for example, FIG. 2, including a neck portion 1 with a screw, a body portion 5 continuous to the neck portion through a shoulder portion 3, and a bottom portion 7 closing the lower end of the body portion. After the container is filled with the content, the opening portion at the upper end of the neck portion 1 is heat-sealed with a metal foil 9 such as an aluminum foil, and a predetermined cap 10 is fitted thereto. Thus, the container can be used as a packing container. To use the packing container, the cap 10 is opened, the metal foil 9 applied with a sealing member is peeled off, and the container is tilted or inverted to take out the content.

The polyolefin packing container of the present invention most desirably has the shape of a bottle as described above but may also assume the shape of a cup by forming, for example, a sheet-like preform for container, and forming the preform by, for example, a plug-assisted forming. The containers of the cup-shape are not tilted to take out the content, but permit the content to be taken out without being left in the container since the container wall effectively suppresses the adhesion of the content; i.e., the present invention is effectively utilized.

<Lubricating Components>

The polyolefin resin layer which is the inner layer of the polyolefin container of the invention is blended with the lubricating component to maintain the desired inverted content fall-down performance.

As the lubricating component, the present invention uses an ethylenebis fatty acid amide. That is, as shown in FIG. 1, the ethylenebis fatty acid amide has polar groups (NHCO groups) bonded to both ends of the ethylene chain to thereby form a hydrophilic portion and has two aliphatic chains extending from the hydrophilic portions to thereby form a hydrophobic portions. Therefore, a dense polymolecular structure is easily formed and, as a result, excellent inverted fall-down performance is exhibited so far as the ethylenebis fatty acid amide is bleeding in a certain amount.

Though there is no specific limitation, it is desired that the ethylenebis fatty acid amide is the one represented by the following formula (1) from such a standpoint that it is regularly arranged to easily form a stable polymolecular layer that does not easily collapse,

wherein
$R^1$ and $R^2$ may be the same or different, and are unsaturated or saturated aliphatic hydrocarbon groups having 14 to 22 carbon atoms.

For example, if either one of the two aliphatic hydrocarbon groups ($R^1$ or $R^2$) has carbon atoms in a number lying outside the above range, then the regularly arranged structure cannot be formed due to a difference in the length thereof, a stable polymolecular layer that does not easily collapse cannot be formed, and the inverted fall-down performance tends to decrease.

Figure 3:
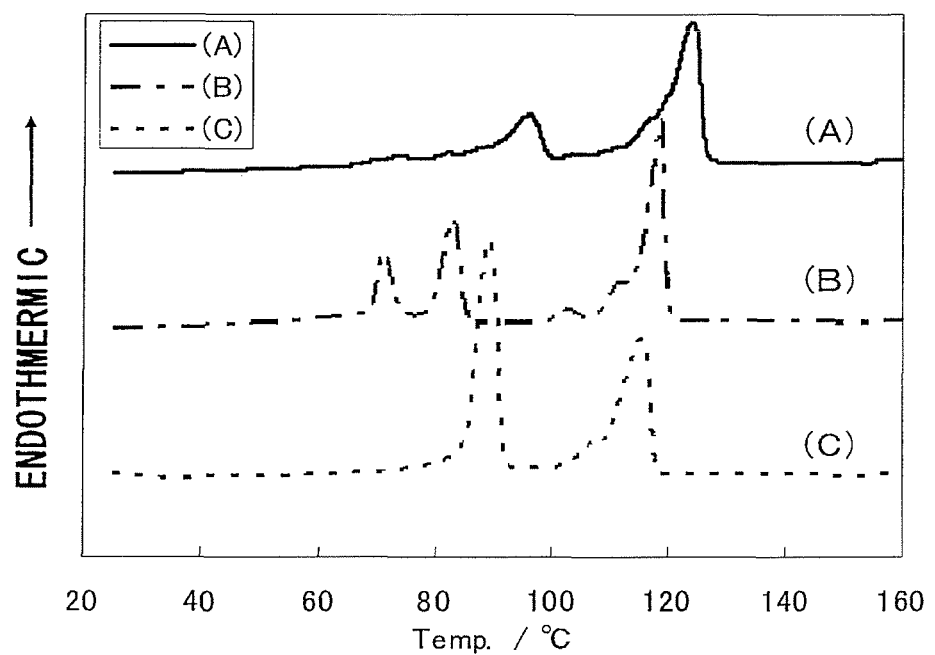
FIG. 3 is a diagram showing a heating-up profile of a commercially available ethylenebis fatty acid amide used in Examples as measured by the differential scanning calorimetry.

In the invention, further, it is desired that the ethylenebis fatty acid amide that is used exhibits a plurality of endothermic peaks in a region of 40 to 130° C. in a heating-up profile (differential thermal curve) as measured by the differential scanning calorimetry. That is, the ethylenebis fatty acid amide is seldom placed in the market in the form of a single compound; i.e., the ethylenebis fatty acid amide, in many cases, contains those having aliphatic chains ($R^1$ and $R^2$) with carbon numbers that are slightly different as well as those having aliphatic chains ($R^1$ and $R^2$) of which the number of unsaturated bonds are different, as unavoidable impurities. Such impurities cannot be easily removed by such operation as distillation. Or even if they could be removed, the purification must be conducted to an excess degree driving up the cost of production. For instance, FIG. 3 is a diagram of differential thermal curves of ethyenebis fatty acid amides placed in the market and used in Examples appearing later, and a plurality of endothermic peaks are appearing on all of these curves.

That is, the plurality of endothermic peaks appearing in the above temperature region on the above differential thermal curves tell that the ethylenebis fatty acid amides include those having unsaturated bonds in the aliphatic chain ($R^1$ or $R^2$) producing high mobility. Therefore, use of the ethylenebis fatty acid amide makes it easy to form the polymolecular layer by being bled and is advantageous from the standpoint of maintaining excellent inverted fall-down performance.

It is, further, desired that the ethylenebis fatty acid amide that describes a differential thermal curve having a plurality of endothermic peaks as mentioned above, contains an ethylenebis oleic acid amide ($R^1$ and $R^2$ are aliphatic unsaturated hydrocarbon groups having 17 carbon atoms). This is because the ethylenebis oleic acid amide easily forms a polymolecular layer structure that exhibits excellent inverted fall-down performance from the standpoint of the lengths of aliphatic chains and mobility.

Namely, it is desired that the ethylenebis fatty acid amide used in the present invention comprises the ethylenebis oleic acid amide as a chief component and, further, contains, the other accompanying ethylenebis fatty acid amide that also satisfies the above-mentioned formula (1) (such as ethylenebismargalic acid amide, ethylenebispalmitic acid amide, ethylenebispalmitoleic acid amide, or a half-saturated bisamide which is the ethylenebis fatty acid amide of which the one aliphatic chain is a saturated group and the other aliphatic chain is an unsaturated group). Among the other ethylenebis fatty acid amides that accompanies the ethylenebis oleic acid amide, the half-saturated bisamide is particularly desired. This is presumably due to that the ethylenebis fatty acid amide (half-saturated bisamide) comprising the unsaturated aliphatic chain and the saturated aliphatic chain possesses a highly mobile portion (unsaturated portion) and a lowly mobile portion (saturated portion) in one molecule and, when bled in the surface, helps improve heat resistance yet exhibiting high slip-down property. Besides, the ethylenebis oleic acid amide which is the chief ingredient is the ethylenebis fatty acid amide (unsaturated bisamide) comprising the two unsaturated aliphatic chains. It is, therefore, presumed that the ethylenebis fatty acid amide that accompanies the ethylenebis oleic acid amide and has one unsaturated portion in the molecule thereof brings about little irregularity in the structure in forming the layer structure, and enables a more stable structure to be formed.

Specifically, it is desired that at least not less than 3% but not more than 30% of the ethylenebis fatty acid amide is the above half-saturated bisamide on condition that not less than 55% of the ethylenebis fatty acid amide is the ethylenebis oleic acid amide as measured by the liquid chromatography. The ethylenebis fatty acid amide having such an aliphatic chain of the saturated hydrocarbon group exhibits endothermic peaks in a temperature region of, for example, not lower than 100° C. on the above-mentioned differential thermal curve, and imparts excellent heat resistance to the polymolecular layer. Namely, presence of such a saturated component suppresses the thermal mobility of the molecules and, therefore, effectively prevents the polymolecular layer from collapsing when the content is hot-filled and makes it possible to assure stable inverted fall-down performance.

For example, when the ethylenebis fatty acid amide that describes a differential thermal curve having a plurality of endothermic peaks in a region of 40 to 130° C. is used as the lubricating agent as mentioned above, a polymolecular layer can be formed by utilizing the thermal mobility of the unsaturated component by filling the content at a temperature of 40 to 90° C. to thereby improve the inverted fall-down performance. When the above-mentioned saturated component is introduced, however, excellent inverted fall-down performance can be maintained even when the content is hot-filled or, concretely, even when the content is filled in a temperature region of 60 to 90° C. or, most desirably, 65 to 90° C.

Specifically, if the temperature at which the content is filled is represented by Tp, peak temperatures of the endothermic peaks by Ti (i=1, 2, 3, - - - ), and integrated values of the endothermic peaks by $\Delta Hi$ (i=1, 2, 3, - - - ), and if the content is hot-filled such that the differential thermal curve of the ethylenebis fatty acid amide satisfies the conditions represented by the following formula (2), $$\Delta H_{high}/\Delta H_{total} > 0.5 \quad (2)$$

wherein $\Delta H_{total}$ is $\Sigma \Delta Hi$, and $\Delta H_{high}$ is the sum of integrated values of the endothermic peaks present in a temperature region satisfying Ti>Tp+10, then there is present in large amounts the component that has a melting point higher than the filling temperature by not less than 10° C. This effectively suppresses the thermal mobility of the polymolecular layer that is formed, and suppresses the polymolecular layer from being collapsed by the hot-filling, offering a very great advantage in maintaining excellent inverted fall-down performance.

In the invention, it is necessary that the ethylenebis fatty acid amide is bleeding in the surface of the olefin resin layer that forms the inner surface of the container in an amount of 12.5 to 200 g/m$^2$ and, specifically, 12.5 to 100 g/m$^2$, and it is desired that the bleeding amount is not less than 16 g/m$^2$. That is, if the bleeding amount is small, the polymolecular layer cannot be formed to a degree sufficient for improving the inverted fall-down performance of the content. On the other hand, even if the bleeding amount is too large, the inverted fall-down performance is not improved any further inviting disadvantage from the standpoint of cost. Further, use of the ethylenebis fatty acid amide in unnecessarily large amounts often causes whitening and impairs transparency of the container.

In the invention, further, the bleeding amount of the ethylenebis fatty acid amide is adjusted to lie in the above-mentioned range. Therefore, when the polyethylene resin is used for forming the inner surface of the packing container, it is desired that the ethylenebis fatty acid amide is added to the polyethylene resin layer in an amount of 0.2 to 1 wt % and, specifically, 0.3 to 1 wt % though it may vary depending on the kind of the olefin resin and the thickness of the inner layer. When the polypropylene resin is used for forming the inner surface of the packing container, further, it is desired that the ethylenebis fatty acid amide is added to the polypropylene resin layer in an amount of 1.2 to 5 wt % and, specifically, 1.5 to 4 wt %. As described earlier, the molecules of the ethylenebis fatty acid amide have a size about twice as large as those of the oleic acid amide and the like amide. Therefore, the ethylenebis fatty acid amide bleeds out very difficulty from the olefin resin layer. Therefore, it becomes necessary to blend the olefin resin layer on the inner surface with the ethylenebis fatty acid amide in amounts larger than the amounts of the lubricating components used so far in the containers.

<Filling the Content>

The polyolefin container which contains the ethylenebis fatty acid amide as the lubricating component in the polyolefin resin layer which is the inner layer, is then used as a packing container for being filled with the content. Here, it is necessary that the content is filled after the passage of a predetermined period of time from when the container was formed. This is because the ethylenebis fatty acid amide bleeds sparingly, and in order to maintain the above-mentioned bleeding amount, the container must be aged for a certain period of time. This is also because if the container is filled with the content, the internal pressure produced by the content suppresses the bleeding. The concrete aging time may differ depending upon the size of the container, the kind of the olefin resin and the thickness of the olefin resin layer. Usually, however, the container after formed is left to stand from about 30 to about 60 days at room temperature (22° C. 60% RH) to attain the bleeding amount that lies in the above-mentioned range.

According to the invention, further, excellent inverted fall-down performance can be maintained when the content is hot-filled, too. Therefore, the container of the invention is very useful as a packing container being for hot-filled. Namely, the content such as ketchup or the like permits bacteria to easily propagate. Due to the hot-filling, however, the container is sterilized and, at the same time, the content is sterilized, too, providing a great advantage from the industrial point of view.

The hot-filling temperature is, usually, not lower than 60° C. As described above, even in case the hot-filling is executed in a temperature of 60 to 90° C. so as to satisfy the conditions of the above-mentioned formula (2), it is allowed to avoid the collapse of the polymolecular layer caused by the hot-filling and to maintain excellent inverted fall-down performance.

The polyolefin container after having been formed is filled with the content as described above and, next, the mouth portion of the container is sealed with the metal foil that was described above. Thereafter, the cap is fitted thereto to obtain a packed body of the content that is hot-filled.

In the invention, when the content is hot-filled, it is allowed to make sure the fact that the ethylenebis fatty acid amide has been regularly arranged in the polymolecular layer on the inner surface of the container from, for example, an X-ray profile obtained by the X-ray diffraction measurement based on the reflection method of the inner surface of the container after the content is taken out from the packing container and after the inner surface of the container is washed with water. This is because the X-ray profile shows peaks that stem from the polymolecular layer structure formed on the inner surface of the container.

In the packing container of the invention, further, the bleeding amount of the ethylenebis fatty acid amide can be calculated by a method of measuring the bleeding amount in the inner surface of the bottle described later after having taken the content out of the packing container and after having washed the inner surface of the container with water and dried.

EXAMPLES

The invention will now be described by way of Examples.

A variety of evaluations and measurements conducted in Examples and the lubricating components that were used were as described below.

1. Testing the Slip-Down of the Content.

A sealing foil was removed from the sample bottle filled with about 500 g of the content (tomato ketchup), 400 g of the content was taken out at room temperature, the cap was fitted, and the bottle was left to stand upright at room temperature for 10 minutes.

Next, the bottle was inverted at 20° C. After left to stand inverted for 5 minutes, the bottle was observed with the eye concerning the state of adhesion of the content on the inner surface of the bottle. The content slip-down performance was evaluated to be ⊚ when the slip-down performance was very good, ○ when the slip-down performance was good, and x when the slip-down performance was poor.

Measuring the Bleeding Amount in the Inner Surface of the Bottle.

By using the 1290 Infinity LC manufactured by Agilent Technologies, Inc. as a liquid chromatography (LC), the bleeding amount of the ethylenebis fatty acid amide in the inner surface of the bottle was measured. First, by using the ethylenebis fatty acid amide added to the bottle, there were prepared various solutions of known concentrations, and a calibration curve was drawn from the total peak areas obtained from the chromatogram. Next, the bleeding component in the inner surface of the prepared bottle was recovered with 30 mL of a tetrahydrofuran (THF, HPLC grade) and, thereafter, the THF was evaporated by using an evaporator, and the residue was dissolved in 2-propanol to prepare the 5 ml of solution thereof. By using the solutions extracted from the inner surfaces of the bottles, the peak areas obtained from the chromatogram were compared with the calibration curve and were regarded to be the bleeding amounts of the bottles.

3. X-Ray Diffraction Measurement (XRD).

After having tested the content fall-down performance, the bottle was washed with water. Next, a test piece measuring 25 mm×20 mm was cut out from the body portion of the bottle, and was attached to a cell for measurement. The cell was mounted on a sample plate so that the inner surface side of the container was the surface to be measured, and the X-ray diffraction measurement was taken (using the X-ray diffraction apparatus manufactured by Rigaku Corporation) based on the reflection method under the following conditions.

Target: Cu
Acceleration voltage: 40 KV
Acceleration current: 200 mA
Measuring range: 1.5 to 7° (2θ)

The measured data were corrected for scattering by the air, and were used as the sample data.

In the X-ray profile of the sample data, a peak near about 1.8 degrees and a peak near about 6 degrees were regarded to be the primary and secondary peaks, and evaluation was made concerning if any peaks appeared.

4. Differential Scanning Calorimetric Measurement.

The ethylenebis fatty acid amide (7 mg) to be added to the innermost layer was measured by using a differential scanning calorimeter (Diamond DSC manufactured by Perkin Elmer Co., Ltd.).

The sample was scanned from 25° C. to 160° C. at a heating-up rate of 10° C./min, and peak temperatures and peak areas were calculated from the obtained profile. The peaks appearing in a plurality of number were regarded to be the first, second and third ones from the side of high temperatures.

5. Analyzing the Composition of the Ethylenebis Fatty Acid Amide (LC/MC Measurement).

The ethylenebis fatty acid amide bleeding in the inner surface of the bottle was analyzed for its composition by using the ACQUITY UPLC manufactured by Waters Co. as a liquid chromatography (LC) and by using the Synapt G2 manufactured by Waters Co. as a mass analyzer (MS).

First, the bleeding component in the inner surface of the prepared bottle was recovered with 30 mL of the tetrahydrofuran (THF, HPLC grade), and the THF was evaporated by using the evaporator. Thereafter, the residue was dissolved in 2-propanol and the 5 ml of solution was prepared. The extracted solutions were analyzed for their compositions by using the LC/MS.

<Ethylenebis Fatty Acid Amides>

There were provided three kinds of the ethylenebis fatty acid amides (A), (B) and (C) to be added to the innermost layer.

Experiment 1

Resin pellets of a low-density polyethylene (MFR=0.3) was fed to a 50-mm extruder, resin pellets of a low-density polyethylene containing 0.5% by weight of the ethylenebis fatty acid amide (A) was fed to a 40-mm extruder as a resin for forming the outermost layer and the innermost layer, resin pellets of a maleic anhydride-modified polyethylene was fed to a 30-mm extruder A as a resin for forming an adhesive layer, and resin pellets of an ethylene-vinyl alcohol copolymer were fed to a 30-mm extruder B as a resin for forming an intermediate layer for shutting off the lubricant. Molten parisons were extruded through a multi-layer die head heated at a temperature of 210 degrees, and 4-kind-6-layer polyethylene multi-layer bottles of a content of 500 g weighing 20 g were prepared relying on the known direct-blow forming method.

The bottles had the following layer constitution in the body portion thereof.
    outermost layer: 30 μm
    adhesive layer: 10 μm
    lubricant shut-off intermediate layer: 25
    adhesive layer: 10 μm
    innermost neighboring layer: 245 μm
    innermost layer: 80 μm The bottles after formed were stored for a predetermined period in an environment of 22° C. 60% RH. Thereafter, two bottles were taken out, and one of which was filled with the tomato ketchup at a temperature of 85° C., thereof and the bottle was stored in an environment of 22° C. 60% RH. On the same day as when the tomato ketchup was filled, the other bottle was measured for the bleeding amount described above. The filled bottle was stored at room temperature for one week, and was tested for its content slip-down performance. Table 1 shows a relationship between the bleeding amounts in the inner surfaces of the bottles and the slip-down performance.

Experiment 2

Polyethylene multi-layer bottles were prepared in the same manner as in Experiment 1 but feeding a mixture of the low-density polyethylene containing 0.5% by weight of the ethylenebis fatty acid amide (A) and a linear low-density polyethylene (low-density polyethylene:linear low-density polyethylene:ethylenebis fatty acid amide (A)=69.5:30:0.5 (weight ratio)) to the 40-mm extruder as a resin for forming the outermost layer and the innermost layer. The bottles after formed were stored for a predetermined period in an environment of 22° C. 60% RH and were, thereafter, measured for their bleeding amounts and were tested for their content slip-down performance in the same manner as in Example 1. Table 1 shows a relationship between the bleeding amounts in the inner surfaces of the bottles and the slip-down performance.

TABLE 1

| | Experiment 1 | | | | | | | | | Experiment 2 | | | | |
|---|---|---|---|---|---|---|---|---|---|---|---|---|---|---|
| *1 | 11.74 | 12.27 | 12.50 | 14.10 | 15.32 | 16.30 | 18.37 | 19.39 | 26.45 | 46.91 | 64.53 | 87.87 | 105.57 | 155.37 |
| *2 | X | X | ○ | ○ | ○ | ◎ | ◎ | ◎ | ◎ | ◎ | ◎ | ◎ | ◎ | ◎ |

*1: Bleeding amount [$mg/m^2$]
*2: Slip-down performance

It is learned from Table 1 that the bottles exhibit slip-down performance if the bleeding amount is not less than 12.5 $mg/m^2$ in the inner surfaces of the bottles. At the same time, it is learned that better performance is exhibited if the bleeding amount is not less than 16 $mg/m^2$.

Figure 4:
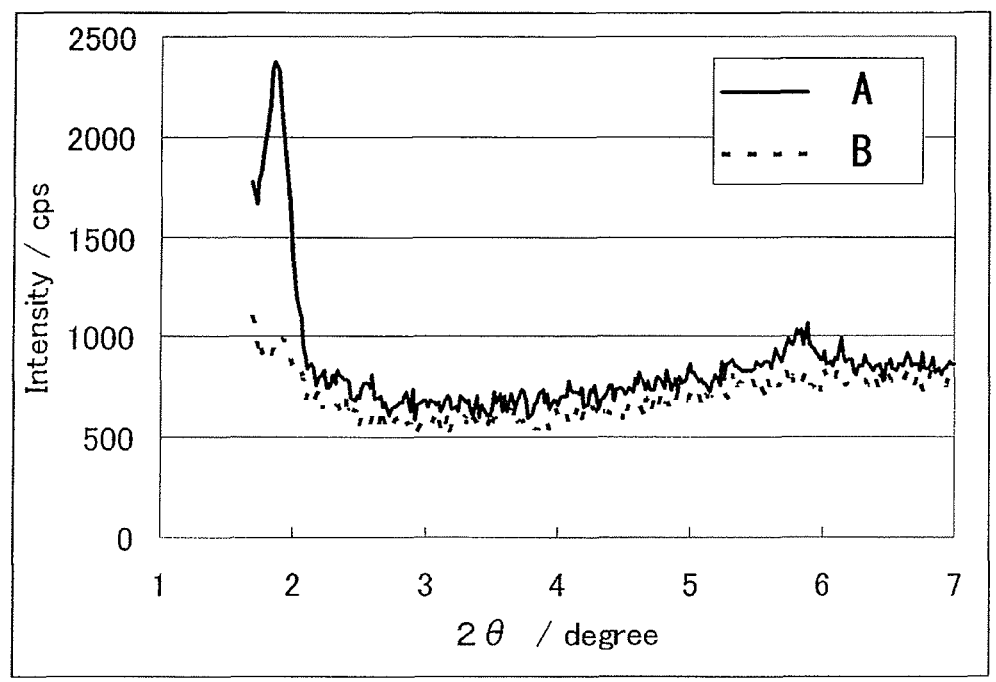
FIG. 4 is a diagram showing the results of X-ray diffraction measurement of the inner surface of the packing container used in Examples.

The bottle that exhibited very good slip-down performance (bottle having a bleeding amount of 26.45 $mg/m^2$) and the bottle that exhibited poor slip-down performance (bottle having a bleeding amount of 11.74 $mg/m^2$) were measured by X-ray diffraction to confirm their surface states. FIG. 4 shows the data that were obtained.

It is learned from FIG. 4 that the bottle that exhibited very good slip-down performance is showing a sharp peak near 2θ=1.8 whereas the bottle that exhibited poor slip-down performance is not vividly showing any peak. It can, therefore, be determined that the bottle that exhibited very good slide-down performance is forming a dense layer structure of the ethylenebis fatty acid amide in the surface. On the other hand, it is considered that the bottle that exhibited poor slip-down performance is not forming a layer structure of the ethylenebis fatty acid amide to a sufficient degree in the surface.

Experiment 3

Resin pellets of a polypropyren (MFR=1.2, 230° C.) was fed to the 50-mm extruder, resin pellets of a polypropylene containing 0.5% by weight of the ethylenebis fatty acid amide (B) was fed to the 40-mm extruder as a resin for forming the outermost layer and the innermost layer, resin pellets of a maleic anhydride-modified polypropylene was fed to the 30-mm extruder A as a resin for forming an adhesive layer, and resin pellets of an ethylene-vinyl alcohol copolymer were fed to the 30-mm extruder B as a resin for forming an intermediate layer for shutting off the lubricant. Molten parisons were extruded through the multi-layer die head heated at a temperature of 210 degrees, and 4-kind-6-layer polypropylene multi-layer bottles of a content of 500 g weighing 18 g were prepared relying on the known direct-blow forming method.

The bottles had the following layer constitution in the body portion thereof.
outermost layer: 30 μm
adhesive layer: 10 μm
lubricant shut-off intermediate layer: 25 μm
adhesive layer: 10 μm
innermost neighboring layer: 265 μm
innermost layer: 60 μm The bottles after formed were stored for a predetermined period and were, thereafter, measured for their bleeding amounts and were tested for their content slip-down performance in the same manner as in Example 1. Table 2 shows a relationship between the bleeding amounts in the inner surfaces of the bottles and the slip-down performance.

Experiment 4

Polypropylene multi-layer bottles were prepared in the same manner as in Experiment 3 but feeding a polypropylene containing 1% by weight of the ethylenebis fatty acid amide (B) to the 40-mm extruder as a resin for forming the outermost layer and the innermost layer. The bottles after formed were stored for a predetermined period and were, thereafter, measured for their bleeding amounts and were tested for their content slip-down performance in the same manner as in Example 3. Table 2 shows a relationship between the bleeding amounts in the inner surfaces of the bottles and the slip-down performance.

Experiment 5

Polypropylene multi-layer bottles were prepared in the same manner as in Experiment 3 but feeding a polypropylene containing 2% by weight of the ethylenebis fatty acid amide (B) to the 40-mm extruder as a resin for forming the outermost layer and the innermost layer. The bottles after formed were stored for a predetermined period and were, thereafter, measured for their bleeding amounts and were tested for their content slip-down performance in the same manner as in Example 3. Table 2 shows a relationship between the bleeding amounts in the inner surfaces of the bottles and the slip-down performance.

Experiment 6

Polypropylene multi-layer bottles were prepared in the same manner as in Experiment 3 but feeding a polypropylene containing 3% by weight of the ethylenebis fatty acid amide (B) to the 40-mm extruder as a resin for forming the outermost layer and the innermost layer. The bottles after formed were stored for a predetermined period and were, thereafter, measured for their bleeding amounts and were tested for their content slip-down performance in the same manner as in Example 3. Table 2 shows a relationship between the bleeding amounts in the inner surfaces of the bottles and the slip-down performance.

TABLE 2

|  | Experiment 3 | | Experiment 4 | | Experiment 5 | | Experiment 6 | |
| --- | --- | --- | --- | --- | --- | --- | --- | --- |
| Bleeding amount [mg/m$^2$] | 3.86 | 4.75 | 5.59 | 6.38 | 23.77 | 30.31 | 53.96 | 74.24 |
| Slip-down performance | X | X | X | X | ⊚ | ⊚ | ⊚ | ⊚ |

It is learned from Table 2 that the bottles do not exhibit slip-down performance if the bleeding amount is less than 12.5 mg/m$^2$ in the inner surfaces of the bottles. At the same time, it is learned that better slip-down performance is exhibited if the bleeding amount is not less than 16 mg/m$^2$.

Experiment 7

4-Kind-6-layer polyethylene multi-layer bottles were prepared in the same manner as in Experiment 1 by using three kinds of the ethylenebis fatty acid amides (A), (B) and (C) to be added to the inner and outer layers. The ethylenebis fatty acid amides (A), (B) and (C) were added each in an amount of 0.5% by weight. The bottles after formed were stored in an environment of 22° C. 60% RH until the ethylenebis fatty acid amide has bled to a sufficient degree. After stored, the bottles were filled the ketchup at 45° C. and 85° C., were stored at room temperature for one week, and were tested for their content slip-down performance. Table 3 shows relationships among the ethylenebis fatty acid amides that were added, the filling temperatures and the slip-down performance.

TABLE 3

| Ethylenebisfatty acid amide | Amount added | Filling temperature | |
| --- | --- | --- | --- |
|  |  | 45° C. | 85° C. |
| (A) | 0.5% | ⊚ | ⊚ |
| (B) | 0.5% | ⊚ | ⊚ |
| (C) | 0.5% | ⊚ | X |

It is learned from Table 3 that when (A) and (B) are used, very good slip-down performance is exhibited at a filling temperature of either 45 or 85° C., while when (C) is used, very good slip-down performance is exhibited at the filling temperature of 45° C., but decreased slip-down performance is exhibited at the filling temperature of 85° C.

Table 4 shows the results of when the ethylenebis fatty acid amides (A), (B) and (C) are used as measured by the differential scanning calorimetry. FIG. 3 shows the obtained profiles.

TABLE 4

| Ethylenebisfatty acid amide | 1st peak temp. °C. | 1st peak area J/g | 2nd peak temp. °C. | 2nd peak area J/g | 3rd peak temp. °C. | 3rd peak area J/g | Total peak area J/g | Peak area ratio at not lower than 95° C. % | Peak area ratio at not lower than 55° C. % |
|---|---|---|---|---|---|---|---|---|---|
| (A) | 124.0 | 54.4 | 95.9 | 24.0 |  |  | 78.4 | 69.4 | 100 |
| (B) | 118.6 | 48.6 | 83.0 | 17.7 | 71.2 | 9.6 | 75.9 | 64.0 | 100 |
| (C) | 115.4 | 36.6 | 89.2 | 45.1 |  |  | 81.7 | 41.0 | 100 |

It is learned from Table 4 that a plurality of endothermic peaks were exhibited by all of the ethylenebis fatty acid amides that were used. It is, further, learned that when (A) and (B) that exhibited slip-down performance at the filling temperature of 85° C. were used, the ratios (peak area ratios at not lower than 95° C.) of the endothermic peak areas at not lower than 95° C. to the sum of the areas of all endothermic peaks were not less than 60%, but when (C) that exhibited decreased slip-down performance was used, the ratio thereof was 41%. It is, therefore, presumed that when the content is filled at 85° C., the component having a high heat resistance occupies a large proportion when (A) and (B) are used and, therefore, the amide layer structure formed in the inner surface is maintained over the whole surface. When (C) is used, however, the component having a high heat resistance occupies a low proportion, and the amide layer formed in the inner surface is wholly collapsed or is partly collapsed. When the content is filled at a high temperature, therefore, it is considered that the peak area ratio of high melting points must be great. When the filling temperature is 45° C., on the other hand, (A), (B) and (C) are all exhibiting slip-down performance. However, there is no endothermic peak at not higher than 55° C. and it is, therefore, considered that the structure of the amide layer formed in the inner surface is neither collapsing nor partly collapsing.

By using the bottles prepared by using the ethylenebis fatty acid amides (A), (B) and (C) in the innermost layer, the bottles being empty without being filled, the ethylenebis fatty acid amides were analyzed for their compositions (LC/MS measurement). Table 5 shows the constituent components of the ethylenebis fatty acid amides bled in the inner surfaces of the bottles.

From Table 5, it is learned that as for (A) and (B) that exhibited good performance at the filling temperature of 85° C., (A) contained about 57% of the ethylenebis oleic acid amide as the component for constituting the ethylenebis fatty acid amide while (B) contained about 66% of it. Further, (A) contained about 5% of the ethylenebisamide (half-saturated bisamide) containing a saturated aliphatic hydrocarbon group while (B) contained about 4% of it. On the other hand, (C) that exhibited decreased performance contained about 81% of the ethylenebis oleic acid amide as the component for constituting the ethylenebis fatty acid amide, and contained about 1% of the ethylenebisamide (half-saturated bisamide) containing a saturated aliphatic hydrocarbon group. (A) and (B) have larger proportions of the ethylenebisamide containing the saturated aliphatic hydrocarbon group than (C). As compared to the unsaturated aliphatic hydrocarbon group, the saturated aliphatic hydrocarbon group tends to heighten the melting point. It is, therefore, considered that (A) and (B) having larger proportions of the ethylenebisamide containing the saturated aliphatic hydrocarbon group have improved heat resistance, do not permit the structures thereof to be collapsed or partly collapsed even at the filling temperature of 85° C., and exhibit slip-down performance even after filled with the content.

The invention claimed is:

1. A polyolefin packing container having on the inner surface thereof an olefin resin layer that contains an ethylenebisfatty acid amide, wherein said ethylenebisfatty acid amide is bleeding in said inner surface in an amount of 12.5 to 200 mg/m$^2$;

wherein said ethylenebisfatty acid amide exhibits a plurality of endothermic peaks in a region of 40 to 130° C. on a heating-up profile (differential thermal curve) as measured by a differential scanning calorimetry;

wherein said ethylenebisfatty acid amide is partly ethylenebisoleic acid amide, and the rest is a compound represented by the following formula (1), $$R^1\text{—CONH—CH}_2\text{—CH}_2\text{—NHCO—}R^2 \quad (1)$$

wherein $R^1$ and $R^2$ may be the same or different, and are unsaturated or saturated aliphatic hydrocarbon

TABLE 5

| Ethylenebisfatty acid amide | Unsaturated bisamide | | | Half-saturated bisamide Ethylenebis amide* % | Others % | Total % |
|---|---|---|---|---|---|---|
|  | Ethylenebisoleic acid amide % | Other than ethylenebisoleic acid amide % | Total unsaturated amides % |  |  |  |
| (A) | 56.9 | 38.1 | 95.0 | 5.0 | 0.0 | 100 |
| (B) | 66.3 | 27.5 | 93.8 | 4.2 | 2.0 | 100 |
| (C) | 80.5 | 17.5 | 98.0 | 0.9 | 1.1 | 100 |

*Ethylenebis amide of which either R1 or R2 in the formula (1) is a saturated aliphatic hydrocarbon group.

groups having 14 to 22 carbon atoms, and either $R^1$ or $R^2$ in the above formula (1) is a saturated aliphatic hydrocarbon group; and wherein at least 3% of said ethylenebisfatty acid amide is said half-saturated bisamide on condition that not less than 55% of said ethylenebisfatty acid amide is the ethylenebisoleic acid amide as measured by a liquid chromatography.

2. The polyolefin packing container according to claim 1, wherein said ethylenebisfatty acid amide is bleeding in an amount in a range of 12.5 to 100 mg/m².

3. The polyolefin packing container according to claim 1, wherein said polyolefin packing container contains a content, said content being filled at a temperature of 40 to 90° C., and if the temperature at which said content is filled is represented by Tp, peak temperatures of the endothermic peaks by Ti (i=1, 2, 3, . . . ), and integrated values of the endothermic peaks by ΔHi (i=1, 2, 3, . . . ), then the differential thermal curve of said ethylenebisfatty acid amide satisfies the conditions represented by the following formula (2), $$\Delta H_{high}/\Delta H_{total} > 0.5 \qquad (2)$$

wherein $\Delta H_{total}$ is $\Sigma \Delta Hi$, and $\Delta H_{high}$ is the sum of integrated values of the endothermic peaks present in a temperature region satisfying Ti>Tp+10.

4. The polyolefin packing container according to claim 3, wherein said content is filled at a temperature of 60 to 90° C.

5. The polyolefin packing container according to claim 4, wherein said content is a non-oily content.

6. The polyolefin packing container according to claim 5, wherein said non-oily content is a ketchup.

* * * * *